(12) United States Patent
Ederle

(10) Patent No.: US 9,563,996 B2
(45) Date of Patent: Feb. 7, 2017

(54) RADIO KEY FOR A VEHICLE

(71) Applicant: AUDI AG, Ingolstadt (DE)

(72) Inventor: Thomas Ederle, Bad Friedrichshall (DE)

(73) Assignee: Audi AG, Inglostadt (DE)

( * ) Notice: Subject to any disclaimer, the term of this patent is extended or adjusted under 35 U.S.C. 154(b) by 0 days.

(21) Appl. No.: 14/443,136

(22) PCT Filed: Nov. 30, 2013

(86) PCT No.: PCT/EP2013/003614
§ 371 (c)(1),
(2) Date: May 15, 2015

(87) PCT Pub. No.: WO2014/094971
PCT Pub. Date: Jun. 26, 2014

(65) Prior Publication Data
US 2015/0310684 A1 Oct. 29, 2015

(30) Foreign Application Priority Data
Dec. 19, 2012 (DE) .................. 10 2012 024 872

(51) Int. Cl.
*G05B 19/00* (2006.01)
*G05B 23/00* (2006.01)
(Continued)

(52) U.S. Cl.
CPC ........... *G07C 9/00309* (2013.01); *B60R 25/24* (2013.01); *B60R 2325/202* (2013.01); *B60R 2325/205* (2013.01); *G07C 2009/00976* (2013.01)

(58) Field of Classification Search
CPC ................. G07C 9/00309; G07C 2009/00976; B60R 25/24; B60R 2325/202; B60R 2325/205
See application file for complete search history.

(56) References Cited

U.S. PATENT DOCUMENTS

| | | |
|---|---|---|
| 6,535,107 B1 | 3/2003 | Bartz |
| 2004/0021550 A1* | 2/2004 | Ohtaki ................. H04B 13/005 340/5.31 |

(Continued)

FOREIGN PATENT DOCUMENTS

| | | |
|---|---|---|
| CN | 1776170 A | 5/2006 |
| DE | 3900494 A1 | 7/1990 |

(Continued)

OTHER PUBLICATIONS

German Examination Report for Application No. 10 2012 024872.5 dated Sep. 20, 2013.

(Continued)

*Primary Examiner* — Erin File
(74) *Attorney, Agent, or Firm* — Alston & Bird LLP

(57) ABSTRACT

The invention relates to a radio key (54) for authenticating a user of a vehicle (12) with respect to a door unlocking system (14) of the vehicle (12) and/or a drive start device (14) of the vehicle (10). The radio key (54) comprises a transponder unit (44) which is designed to receive a query signal (50) transmitted wirelessly from the vehicle (12) and to transmit, depending on the received query signal (50), an authentication signal (52) based on an authentication code. The transponder unit (44) is arranged in a casing (42). The invention is based on the problem of designing the use of a radio key to be more convenient. An area (54) of the casing (42) has a shape of an insertion area of a standardized memory card for a mobile terminal (10), by means of which the memory card is to be stuck in accordance with the (Continued)

Figure 1:
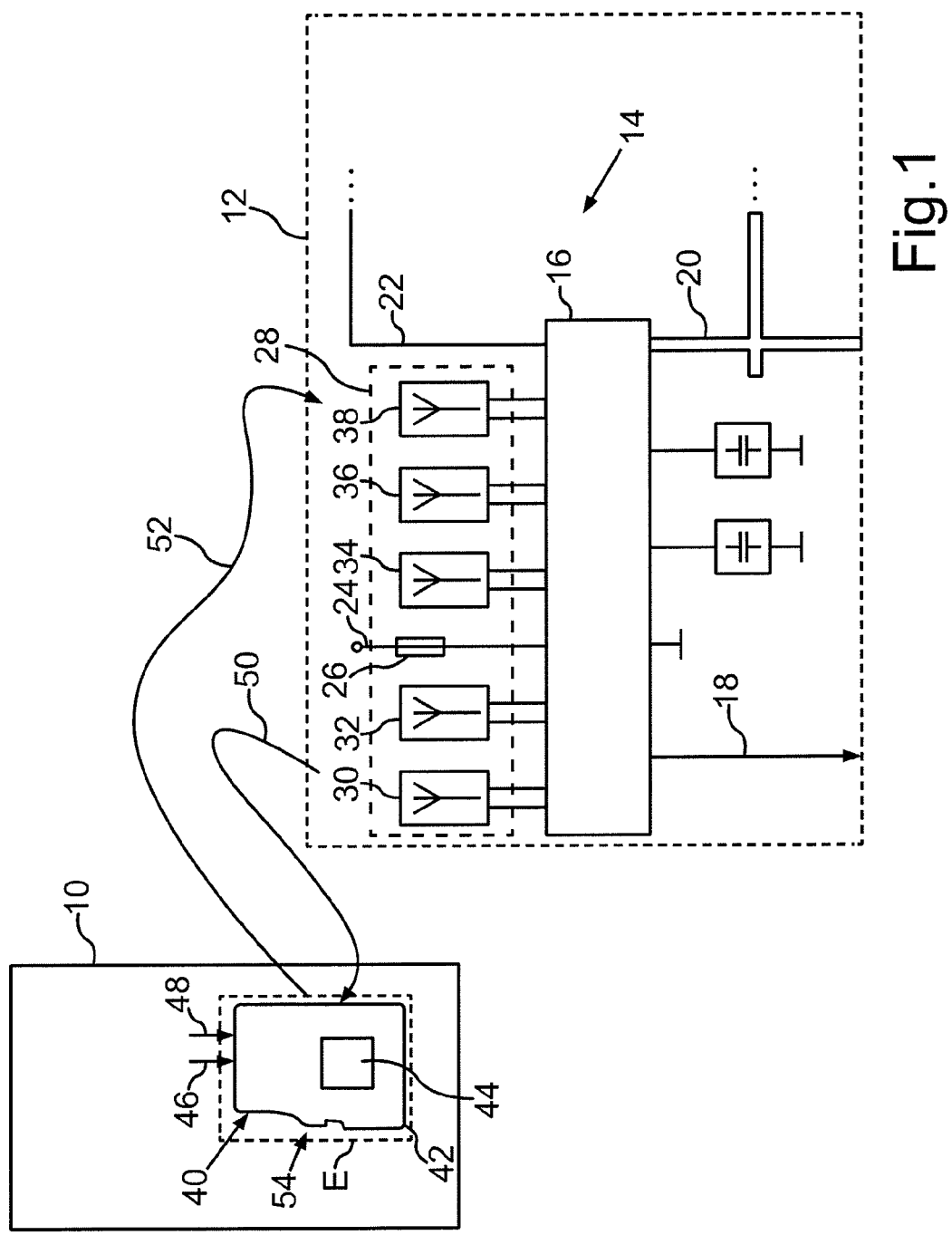

standard in an insertion slot (E) of the mobile terminal (10). The radio key can thus be integrated in a mobile terminal.

9 Claims, 2 Drawing Sheets

(51) Int. Cl.
*G06F 7/00* (2006.01)
*G06F 7/04* (2006.01)
*G06K 19/00* (2006.01)
*G08B 29/00* (2006.01)
*G08C 19/00* (2006.01)
*H04B 1/00* (2006.01)
*H04B 1/38* (2015.01)
*H04B 3/00* (2006.01)
*H04Q 1/00* (2006.01)
*H04Q 9/00* (2006.01)
*G07C 9/00* (2006.01)
*B60R 25/24* (2013.01)

(56) References Cited

U.S. PATENT DOCUMENTS

| 2006/0061458 | A1* | 3/2006 | Simon | B60R 25/04 340/426.35 |
| 2006/0219776 | A1* | 10/2006 | Finn | B60R 25/25 235/380 |
| 2008/0147268 | A1 | 6/2008 | Fuller | |
| 2009/0146830 | A1 | 6/2009 | Ogiso | |
| 2011/0230147 | A1* | 9/2011 | Schuh | H01Q 1/2275 455/90.2 |
| 2011/0264304 | A1 | 10/2011 | Burzio | |
| 2012/0113269 | A1* | 5/2012 | Birch | H04N 5/44 348/192 |
| 2015/0310684 | A1* | 10/2015 | Ederle | B60R 25/24 340/5.61 |
| 2016/0012465 | A1* | 1/2016 | Sharp | G06Q 30/0215 705/14.17 |

FOREIGN PATENT DOCUMENTS

| DE | 196 44 237 A1 | 4/1998 |
| DE | 196 50 048 A1 | 6/1998 |
| DE | 198 52 223 A1 | 5/2000 |
| DE | 20 2004 005 967 U1 | 6/2004 |
| DE | 10 2008 037 018 A1 | 2/2010 |
| DE | 10 2010 006 149 A1 | 8/2011 |
| DE | 10 2011 011 697 A1 | 12/2011 |
| DE | 10 2010 061 351 A1 | 6/2012 |
| EP | 0 846 822 A2 | 6/1998 |
| EP | 1 000 825 A2 | 5/2000 |
| EP | 1583041 A1 | 10/2005 |
| EP | 2 264 672 A2 | 12/2010 |
| FR | 2 719 818 A1 | 11/1995 |
| WO | WO 02/051676 | 7/2002 |
| WO | WO 2011/158236 A2 | 12/2011 |

OTHER PUBLICATIONS

International Search Report from International Application No. PCT/EP2013/003614, mailed May 13, 2014.
International Preliminary Report on Patentability for International Patent Application No. PCT/EP2013/003614 dated Jun. 25, 2015, 11 pages.
Office Action for Chinese Patent Application No. 201380060332.2 dated Apr. 5, 2016.
Office Action for German Patent Application No. 10 2012 024872.5 dated Oct. 27, 2016, 12 pages.

* cited by examiner

RADIO KEY FOR A VEHICLE

The invention relates to a radio key for authenticating a user of a vehicle with respect to a door unlocking system of the vehicle and/or a drive start device of the vehicle. Radio keys of this type are known in the prior art under the name "Keyless go" ®, for example.

A radio key is known, for example, from DE 10 2008 037 018 A1. The known systems allow the user of a engine vehicle, for example, a passenger car, to bring about the unlocking of the door of the vehicle without having to insert a key into a lock of the vehicle in the process, for example, in order to activate the central locking system for unlocking the doors. Instead, the presence of the user outside of the vehicle is detected by radio, and the door unlocking system is already activated when the user, for example, merely actuates a door handle of a vehicle door. It is equally possible for the activation of a drive start device of the vehicle to occur without an ignition key which the user would have to insert into an ignition switch of the vehicle. For this purpose, the presence of the user in the interior of the vehicle can be detected, and depending on said detection, the drive start device can be approved. The user then merely needs to actuate, for example, a start/stop button of the drive start device in order to start the engine of the vehicle.

To prevent a random person from being able to unlock the vehicle doors or to start the engine of the vehicle, an authentication mechanism is required. For this purpose, the user of the vehicle has to carry a radio key with him, which identifies him unequivocally by means of an authentication code. Locating the user outside of the vehicle occurs then actually in that the presence of the driver, but of the radio key, is detected by radio technology, and the authentication code is transmitted by the radio key to the vehicle. In the same way, locating the radio key in the vehicle interior occurs in order to ensure that an authorized person has sat down behind the steering wheel of the vehicle.

The central features of such a radio key are, on the one hand, a transponder unit which is designed to receive a query signal transmitted wirelessly from the vehicle, and to transmit, depending on the query signal received, an authentication signal based on the authentication code. On the other hand, the transponder unit is arranged for its protection in a casing. Usually, this casing is in the shape of a key handle, as is also commonly used for ignition keys. Often, a key for a door lock of the vehicle is also integrated in the casing, in order to allow access to the vehicle in the case of failure of the transponder unit.

A radio key must always be carried along by the user of a vehicle so that he can gain access to the vehicle. However, since the user does not have to actively operate the radio key for access to the vehicle, many users quickly forget that they must take the radio key along with them and as a result leave it, for example, in the pocket of a clothing item when leaving their home. It is only when a user stands before the vehicle and jiggles a door handle of his vehicle without success that he becomes aware that he has to walk back home again to get the radio key.

The invention is based on the problem of making the use of a radio key more convenient.

The problem is solved by a radio key as well as by a computer program product according to example embodiments described herein.

The radio key according to the invention differs from the radio key known in the prior art in that the transponder unit is arranged in a casing which has a very specific shape. In the radio key according to the invention, the transponder unit is arranged in a casing, in which an area of the casing is in the shape of an insertion area of a standardized memory card for a mobile terminal, that is to say, for example, of a Micro SD card. Insertion area refers to that area of the memory card by means of which the memory card can be stuck according to standard in an insertion slot of the mobile terminal. Usually, it is an area with a recess in which a catch arranged in the insertion slot engages to hold a memory card. In other words, the casing of the radio key according to the invention can also be inserted into an insertion slot for a memory card of a mobile terminal and affixed there.

The radio key according to the invention has the advantage that the user of a vehicle can now stick the radio key in his mobile terminal and thus carry it around with him. In the context of the invention, a mobile terminal here refers, for example, to a mobile telephone, a smartphone, a tablet PC, a notebook, a laptop computer, a palmtop PC, an MP3 player or a PDA (Personal Digital Assistant). The mobile terminal here may be provided with a mobile radio communication module or not.

The invention is based on the finding that most users of a vehicle that is to be operated with a radio key also always carry a mobile terminal with them, such as a smartphone, for example. Since the users in general are always concerned about being accessible by telephone or, for example, about being able to manage their appointments including when they are on the road, it is much more unlikely that a user will forget his mobile terminal. In addition, as a rule, a user will pay as much attention to his mobile terminal as to a radio key, since he also does not want to loose the mobile terminal given its value. Therefore, the risk of losing the radio key according to the invention is no greater than in the case of a conventional radio key.

A preferred embodiment of the invention provides for the shape of the casing of the radio key to correspond overall to a form factor of the standard for the standardized memory card. In other words, the casing of the radio key looks at least almost the same as a memory card. The resulting advantage is that the transponder unit can be integrated entirely in a mobile terminal, that is to say a smartphone, for example.

Preferably the form factor is the one on which one of the following memory cards is based: a SD memory card, a Micro SD memory card, a Nano SD memory card. The form factors for these memory cards can be obtained from the SD Association and they can be accessed, for example, via the Internet portal that has the Internet address www.sdcard.org. A particularly preferable embodiment provides for integrating the transponder unit in a Micro SD card casing. At the time of insertion into a mobile terminal, the behavior of the radio key, particularly the mechanical behavior, is exactly like that of such a memory card. Below, the term "SD memory card" always refers to all three mentioned card types, unless explicitly indicated otherwise.

The transponder unit is preferably designed in accordance with a near field communication standard, particularly a RFID standard (RFID—Radio Frequency Identification) and/or a NFC standard (NFC—Near Field Communication) and/or a Bluetooth standard. Then, the radio key according to the invention can interact with vehicles like a radio key known from the prior art.

A particular protection against manipulation of the radio key, for example, by malware that is executed on the mobile terminal and attempts, for example, to copy the authentication code, is achieved according to an embodiment in which the transponder unit is designed so as to perform a wired exchange with the mobile terminal either only unidirectionally toward the transponder unit or not at all. It is then not possible to read out, for example, the authentication code, from a mobile terminal in which the radio key is inserted. The interconnection of the transponder unit in the casing is thus autonomous. In the context of the invention, the transponder unit here should be understood to refer to the system consisting of the receiver electronics for the query signal, the transmission electronics for the authentication signal and the authorization electronics, wherein the authorization electronics comprises a processor for processing the query signal and for generating the authentication signal, and a memory element for the authentication code. The transponder unit receives the query signal and sends the authentication signal via an antenna. The antenna of the transponder unit can also be integrated in the casing.

However, an additional advantage is achieved if the radio key has an antenna arranged outside the casing. By designing the antenna structure, for example, as output on the casing, the transmission quality, particularly the signal-to-noise ratio, in the communication with a vehicle can be improved.

It is preferable to design the antenna so that it is flexible, that is to say in particular as a so-called pigtail. The antenna can then nestle against the casing of the mobile terminal, so that it does not protrude and cannot be accidentally snapped off by the user of the mobile terminal.

Another advantage is achieved if the antenna is arranged on a flexible carrier part, in particular a foil, preferably a flex foil. Such a carrier part stabilizes the shape of the antenna. In addition, the antenna can be attached, for example, bonded, more simply via the carrier portion to the mobile terminal. The use of a flex foil moreover allows the production of conducting paths that form the antenna structure in a very cost effective manner.

It is also possible to provide for designing the transponder unit so that it transmits the authentication signal via an antenna of the mobile terminal.

According to an advantageous embodiment, the authentication code stored in the radio key comprises an identification value issued individually for the radio key. If the user loses the radio key, the radio key can then be locked in a targeted manner by deleting the identification value in the vehicle from the memory in which the authorized radio key is listed. The identification value can be, for example, a specific transponder ID of the transponder unit, a serial number of the radio key or a part number of the radio key, as can be issued by a vehicle manufacturer.

An additional advantage is achieved if the radio key comprises a power supply connection accessible from outside for receiving a supply voltage from the mobile terminal. The radio key can then be supplied with electrical energy via the mobile terminal. The radio key then does not need to have a separate battery. In this manner, advantageously, the emergency start function, which is required in the case of a conventional radio key whose battery is discharged, can be dispensed with. The radio key according to the invention can thus also be produced with lower circuitry complexity and thus more cost effectively.

The power supply connection is preferably designed according to the standard for the memory card, so that, as far as the mobile terminal is concerned, no construction-related modifications are required for supplying the radio key with electrical energy.

An additional advantage is achieved if the radio key comprises a communication interface according to a standard for a communication interface for the memory card. Such communication interfaces for memory cards, that is to say, for example, for SD memory cards, are designed in order to enable an exchange of data between the memory card and the mobile terminal. By integrating such a communication interface in the radio key, the advantage is achieved that data can also be exchanged between the radio key and the mobile terminal Thus, an advantageous variant provides that the radio key also comprises a memory which is coupled to the communication interface. The radio key can then behave exactly like a conventional memory card with respect to the mobile terminal. The radio key can then advantageously also be used by a mobile terminal like a conventional memory card, namely as an additional memory.

An additional advantage is achieved if the radio key comprises a control device which is designed to receive code word data from the mobile terminal via the communication interface and to activate the transponder unit depending on the received code word data. It is then possible to lock the radio key and to enable the use of the radio key for the authentication of a user with respect to a door unlocking system or a drive start device only when the user enters a correct code word via the mobile terminal. Instead of or in addition to the code word data, it is also possible to provide that the control device receives identification data of the mobile terminal. This results in the advantage that the radio key can be operated only with a specific mobile terminal. The control unit can comprise an integrated circuit which provides the described functionalities.

In order to be able to transmit code word data or identification data of the mobile terminal from a mobile terminal to the radio key, a corresponding application such as, for example, a so-called "app," has to be installed and implemented on the mobile terminal. In this context, the invention also comprises a computer program product with a program code stored in at least one memory medium and designed appropriately for transmitting, at the time of execution by a processor unit of a mobile terminal, data to a radio key according to the invention inserted in a memory slot of the mobile terminal. The data is then code word data generated from a code word that was queried by a user of the mobile terminal, on the one hand. In addition or alternatively to this, the transmitted data can also comprise the identification data of the mobile terminal, which is read out from a memory of the mobile terminal.

In this connection, an advantageous variant of the computer program product provides that, as identification data of the mobile terminal, at least one of the following values is read out; an IMEI serial number (IMEI—International Mobile Equipment Identity), a WLAN MAC address (WLAN—Wireless Local Area Network; MAC—Media Access Control), a Bluetooth MAC address. These values have the advantage that they are as a rule available in a terminal and thereby issued individually for each mobile terminal, so that an unequivocal identification of the mobile terminal is already possible, without expensive additional measures.

The invention is explained again in further detail below in reference to concrete embodiment examples.

Figure 2:
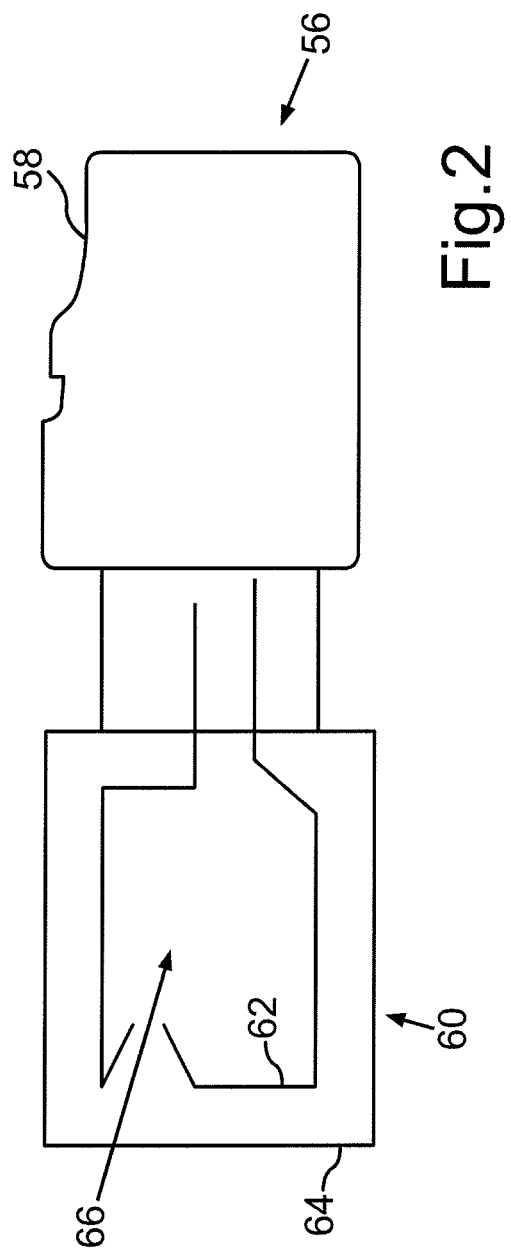

FIG. 1 shows a diagrammatic representation of a mobile terminal with a preferred embodiment of the radio key according to the invention inserted therein, which communicates with a vehicle, and FIG. 2 shows another preferred embodiment of the radio key according to the invention.

The embodiment examples shown represent preferred embodiments of the invention. However, in the embodiment examples, the described components of the embodiment and the described steps of the method each represent individual features of the invention which are to be considered independently of one another, which in each case also provide variants of the invention independently of one another and thus they can also be considered either individually or in a combination other than the one shown as a part of the invention. Moreover, the described embodiments can also be supplemented by other features of the invention that have already been described.

In FIG. 1, a mobile terminal 10 and a vehicle 12 are shown. The mobile terminal 10 can be, for example, a smartphone, a mobile telephone, a tablet PC or another apparatus having the function of a PMA (Personal Mobile Assistant). The vehicle 12 is, for example, a motor vehicle, in particular a passenger car.

The vehicle 12 comprises an authentication system 14 for keyless access to the vehicle and for keyless starting of same. Such an identification system is known, for example, from the company Audi under the product name "Komfortschlüssel [convenience key]" or "Kessy." It is also possible to provide that only one of the two functions (access or start) is implemented. "Keyless" here means, for example, that no key made of metal needs to be inserted into a lock of the vehicle in order to be able to unlock the vehicle door, on the one hand, and to actuate the starter of the engine of the vehicle 12, on the other hand.

The authentication system 14 comprises a control device 16 for verifying the access and start authorization. In the case of a successful authentication of a user of the vehicle 12, a corresponding release signal for the unlocking the door or starting the engine can be transmitted by the control device 16 via a wake-up line 18, a communication bus 20, for example, a CAN Bus (CAN—Controller Area Network) and two additional control lines 22, 24. The control line 22 leads to the terminal 58 of the vehicle, the control line 24 to the terminal 30, wherein the control line 24 can be protected by an electrical cutout 26, for example, a fuse. Via the communication bus 20, the control device 16 can control a convenience unit of the vehicle 12, for example, an air conditioning system.

In order to gain access to the vehicle 12, a user (not shown) of the vehicle 12 must carry a radio key with him, which can contain a RFID transponder, for example. The authentication system 16 can communicate with such a RFID transponder via an antenna array 28 consisting here of five antennas 30, 32, 34, 36, 38. By means of the antenna arrangement 28, the control device can also locate the RFID transponder and thereby determine whether the RFID transponder is located outside the vehicle 12 or inside same. If the RFID transponder is located outside the vehicle 12, then only the vehicle door lock is released by a corresponding signal via one of the lines 18, 22, 24 or the communication bus 20, i.e., the user can trigger the unlocking of the door, for example, by actuating a door handle. The control device 16 generates a release signal via one of the lines 18, 22, 24 or via the communication bus 20, in order to approve the starting of the engine of the vehicle 12, only if the RFID transponder is located in a vehicle interior of the vehicle 12.

For the release, in the depicted example, the user of the vehicle 12 does not have to carry with him a separate radio key, for example, in the form of a keychain or the like. It is sufficient for the user to carry his mobile terminal 10 with him. In the mobile terminal 10, an integrated radio key 40 is located, which is sufficient for the authentication with respect to the authentication system 14. The radio key 40 is inserted into an insertion slot E of the mobile terminal 10. The insertion slot E is actually provided by the manufacturer of the mobile terminal for connecting a memory card, for example, an SD memory card, to the mobile terminal 10. The insertion slot can be, for example, a slot for a memory card according to the standard for an SD card, a micro SD card or a nano SD card. However, it is also possible to use other memory card formats as the basis. The radio key 40 accordingly has a casing 42 with a form factor of a corresponding memory card, which fits, in accordance with the intended use, in the insertion slot of the mobile terminal 10 and can be locked there in accordance with the intended use.

In the casing 42, a transponder electronics 44 is located, which in its operation corresponds to a transponder electronics of a conventional radio key. The transponder electronics 44 represents a transponder unit in the sense of the invention. A conventional radio key differs from the radio key 40 only in that it is arranged in a casing that is, in general, much larger, so that the radio key would have to be carried along as a separate apparatus, in addition to the mobile terminal 10.

In the insertion slot, a power supply connection 46 and a communication connection 48 are located. If a conventional memory card is located in the insertion slot, the mobile terminal is capable of exchanging memory and control data with this memory card by means of the connections 46, 48. The radio key 40 also can be designed to tap the supply voltage from the power supply connection 46 and thus operate the transponder electronics 44. The casing 42 then has accordingly a power supply connection accessible from the outside, which is in contact with the power supply connection 46 when the radio key 40 is inserted in the insertion slot E.

Optionally, it is also possible to provide that the radio key 40 comprises a communication interface which, in the inserted state of the radio key 40, is in contact with the communication connection 48, so that data can also be exchanged between the radio key 40 and the mobile terminal 10.

While the user with his mobile terminal 10 stands near the vehicle 12 and actuates, for example, a door handle (not shown) of the vehicle 12, the authorization system 14 transmits via the antenna arrangement 28 a query signal 50 which is received by an antenna arranged in the casing 42 and processed by the transponder electronics 44 in a manner which in itself is known. The transponder electronics 44 generates accordingly an authorization signal 52 in reaction to the query signal 50, which it transmits via the antenna of the radio key 40. The authorization signal 52 can comprise a transponder ID, for example, which unequivocally identifies the radio key 40. Via the antenna arrangement 28, the authorization system 14 receives the authentication signal 52 and processes it by means of the control device 16 in a manner which in itself is known. In other words, the radio key 40 cannot be distinguished from a conventional radio key from outside the mobile terminal 10. Thus, the radio key 40 is completely compatible with the conventional keyless access systems of vehicles.

The shape of the casing 42 does not have to correspond exactly to that of a memory card as provided for the insertion slot of the mobile terminal 10. For example, the casing 42 can also protrude slightly from the memory slot without thereby impairing the operation of the mobile terminal 10 or of the radio key 40. In order to hold the radio key 40 reliably in the memory slot, at least the area 54 should correspond to the shape of a memory card, area which is needed for anchoring or locking the casing 42 in the memory slot in accordance with the corresponding standard for memory cards.

In FIG. 2, a radio key 56 is shown, which can also be inserted in an insertion slot of a mobile terminal and held there by a locking mechanism of the insertion slot. For this purpose, in accordance with the principle of the invention, a casing 58 of the radio key 56 has the shape of a corresponding memory card, which corresponds to the shape of the memory slot. In the case of the radio key 56, an output 60 is attached to the casing 58, which comprises an antenna structure 62 attached to a flexible foil 64, for example, a pigtail flex foil. The casing 58 can be, for example, a casing according to the form factor for a micro SD card.

By means of the antenna structure 62 mounted outside, it is possible to provide a sufficiently large area 66 for transmitting and receiving signals using RFID technology. As a result of the flexible design of the antenna structure 62 and the carrier foil 64, said parts can be bent, for example, in the inserted state of the casing 58, and a cover, for example, for a battery slot, can be attached on a casing of a mobile terminal. For this purpose, the carrier foil 64 can have, for example, a prepared adhesive surface.

This example shows how a radio key electronics can be miniaturized, for example, integrated on a micro SD card. The micro SD card can then be operated in a smartphone. A user of a vehicle then does not have to carry two objects with him, which he must not loose, for example, due to their value, namely the radio key and the smartphone. The function of the smartphone can be designed both for the purpose of opening the vehicle and also for the start release, and it can be integrated with no problem in a smartphone. Here, it is possible to take all the security- and process-relevant requirements into consideration. Thus, the complete authorization electronics, that is to say the transponder unit, can be operated autonomously, so that there is no communication of authorization data to a smartphone. The integrated radio key, like a conventional radio key, receives its own transponder ID, serial number and part number, so that it can be treated as another accessory part for vehicles without requiring for that purpose a logistical reorganization. A great advantage is that the power supply for the radio key can occur by means of the smartphone, so that a special battery does not need to be provided, and the battery can be charged by means of conventional charging apparatuses for smartphones.

Optionally, a PIN query can occur via the smartphone, and in this manner the release of the authorized function of the control key can be controlled depending on a password or a PIN. For this purpose, a corresponding application (app) for the smartphone can be provided.

The authorization function can be coupled to specific smartphone data such as, for example, the IMEI serial number, a WLAN/Bluetooth MAC address and other data that unequivocally identify a specific smartphone. It is also possible to provide for integrating a flash data storage in the radio key, so that the radio key can be used like a conventional memory card for increasing the internal smartphone memory. Such a flash data memory moreover makes it possible to operate the authorization electronics in an autonomous manner. Since the radio key can be supplied with voltage by a smartphone, it is possible to dispense with the so-called emergency start function of conventional radio keys, which requires that the radio key can be supplied with energy via a transponder coil, in order to continue to allow access to the vehicle even if the battery of the radio key is discharged. For the case where smartphones do not include insertion slots for memory cards that are accessible from outside, an agreement can be concluded with the manufacturers of such models of smartphones to the effect that the corresponding radio key with the shape of a memory card for such models is produced as an off-the-shelf part and available to the manufacturer of the smartphones for the latter to incorporate during production in the corresponding smartphones.

A radio key integrated in a casing for a memory card can be adjusted in a simple way for use with a certain vehicle. For this purpose, the radio key is inserted into a mobile terminal in the appropriate insertion slot, and the vehicle is switched to a learning mode in which it receives, for example, the transponder ID or another identification number of the radio key from the latter and (optionally after an appropriate further inquiry with the user of the vehicle) stores it as an authorized radio key in the corresponding memory of the vehicle. From then on, the radio key can be used for authorizing access or starting of the vehicle. Should the user lose the radio key, it is accordingly simple to ensure the security of the vehicle. For this purpose, the identification number can then simply be deleted again from the memory of the vehicle. The radio key is so to speak signed out from the vehicle. In exactly the same way, the radio key can also be simply handed to the new owner at the time of the sale of the vehicle. Since memory cards as a rule can be removed again directly from a mobile terminal, the same possibility also exists accordingly for the radio key. In exactly the same manner, several radio keys in the form of a memory card can also be learned by a vehicle, so that several persons can have access to the vehicle using their mobile terminals. The radio keys in the form of memory cards can also be used together with conventional radio keys in parallel. Indeed, the vehicle electronics does not have to be adapted in any way for the use of the radio key according to the invention.

For the power supply and optionally for the communication (for example, for entering a PIN), the radio key according to the invention can use the standardized interface for memory cards, that is to say SD cards, for example. As a result, the radio key is independent of the operating system installed on the mobile terminal and the user programs running on the mobile terminal.

The invention claimed is:

1. Radio key for authenticating a user of a vehicle with respect to a door unlocking system of the vehicle and/or a drive start device of the vehicle comprising:
   a transponder unit which is designed to receive a query signal transmitted wirelessly from the vehicle and to transmit, depending on the received query signal, an authentication signal based on an authentication code, and
   a casing in which the transponder unit is arranged, wherein an area of the housing has a shape of an insertion area of a standardized memory card for a smartphone by means of which the memory card is to be stuck in accordance with the standard in an insertion slot of the smartphone, wherein the shape is based on a form factor of one of the following memory cards: a SD memory card, a micro SD memory card, or a nano SD memory card, characterized in that the transponder unit is designed
   a) to carry out a wired data exchange with the smartphone either only unidirectionally towards the transponder unit or not at all, so that it is not possible to read out the authentication code from the smartphone in which the radio key is inserted, and
   b) to be operated autonomously, so that no communication of authorization data to the smartphone occurs, and in that the radio key comprises a communication interface according to a standard for a communication interface for the memory card, and the radio key comprises a control device which is designed to receive code word data and/or identification data of the smartphone from the smartphone via the communication interface and to activate the transponder unit depending on the received data such that the radio key is only enabled for use with the vehicle in response to receipt of the code word data and/or the identification data from the smartphone.

2. Radio key according to claim 1, wherein the shape of the housing overall corresponds to a form factor of the standard for the standardized memory card.

3. Radio key according to claim 1, wherein the transponder unit is designed according to a near field communication standard, in particular a RFID standard and/or a NFC standard and/or a Bluetooth standard.

4. Radio key according to claim 1, wherein the radio key comprises an antenna arranged outside of the housing.

5. Radio key according to claim 4, wherein the antenna is designed to be flexible.

6. Radio key according to claim 4, wherein the antenna is arranged on a flexible carrier part comprising a flex film.

7. Radio key according to claim 1, wherein the authentication code comprises an identification value issued individually for the radio key, in particular a transponder ID specific to the transponder unit, a serial number of the radio key or a part number of the radio key.

8. Radio key according to claim 1, wherein the radio key comprises a current supply connection accessible from outside for receiving a power supply voltage from the mobile terminal.

9. Radio key according to claim 1, wherein the radio key comprises a memory which is coupled to the communication interface.

* * * * *